US010017088B2

(12) United States Patent
An et al.

(10) Patent No.: US 10,017,088 B2
(45) Date of Patent: Jul. 10, 2018

(54) FOOTREST APPARATUS

(71) Applicant: HYUNDAI DYMOS INCORPORATED, Seosan-si, Chungcheongnam-do (KR)

(72) Inventors: Sung Chol An, Hwaseong-si (KR); Jin Ho Seo, Yongin-si (KR); Jun Kyu Kim, Hwaseong-si (KR); Chan Uk Park, Gyeongju-si (KR); Myeong Sub Kim, Seongnam-si (KR); Yun Ho Kim, Osan-si (KR); Doug Hwan Kim, Hwaseong-si (KR)

(73) Assignee: HYUNDAI DYMOS INCORPORATED, Seosan-si, Chungcheongnam-Do (KR)

( * ) Notice: Subject to any disclaimer, the term of this patent is extended or adjusted under 35 U.S.C. 154(b) by 0 days.

(21) Appl. No.: 15/327,125

(22) PCT Filed: Jul. 9, 2015

(86) PCT No.: PCT/KR2015/007104
§ 371 (c)(1),
(2) Date: Jan. 18, 2017

(87) PCT Pub. No.: WO2016/013786
PCT Pub. Date: Jan. 28, 2016

(65) Prior Publication Data
US 2017/0197534 A1    Jul. 13, 2017

(30) Foreign Application Priority Data
Jul. 25, 2014  (KR) ........................ 10-2014-0094562

(51) Int. Cl.
*A47C 7/50* (2006.01)
*A47C 20/00* (2006.01)
(Continued)

(52) U.S. Cl.
CPC .............. *B60N 3/063* (2013.01); *A47C 7/506* (2013.01); *B64D 11/0643* (2014.12)

(58) Field of Classification Search
CPC ...... B60N 3/063; B60N 3/06; B64D 11/0643; B64D 11/0639; A47C 7/506; A47C 7/50; A47C 7/503; A47C 7/52
(Continued)

(56) References Cited

U.S. PATENT DOCUMENTS 2,093,455 A * 9/1937 Knight ................. B61D 33/005
297/423.15
5,312,155 A * 5/1994 Akima .................. B60N 3/063
297/180.13
(Continued)

FOREIGN PATENT DOCUMENTS

JP    2008-239013 A    10/2008
KR    10-2010-0066635 A    6/2010
(Continued)

OTHER PUBLICATIONS

Translation of International Search Report, PCT/KR2015/007104, filed Jul. 9, 2015, search dated Oct. 6, 2015, 2pp.

*Primary Examiner* — Mark R Wendell
(74) *Attorney, Agent, or Firm* — Brinks Gilson & Lione

(57) ABSTRACT

The present disclosure provides a footrest including: a bracket that has a plurality of wings and that is coupled to a back of a seat, the plurality of wings spaced apart at a predetermined distance from each other and extending rearward; an actuating unit to rotate a rotary shaft hingedly coupled to the plurality of wings; and a panel that is coupled to the rotary shaft and is folded or unfolded toward or away from a seatback when the rotary shaft is rotated.

7 Claims, 4 Drawing Sheets

(51) Int. Cl.
*B60N 3/06* (2006.01)
*B64D 11/06* (2006.01)

(58) Field of Classification Search
USPC .............. 297/423.26–423.29, 423.3, 423.19, 297/423.15, 423.35, 423.21, 423.25
See application file for complete search history.

(56) References Cited

U.S. PATENT DOCUMENTS

| | | | | |
|---|---|---|---|---|
| 7,108,329 | B1 * | 9/2006 | Clough | B60N 3/063 297/423.19 |
| 7,866,755 | B2 * | 1/2011 | Okano | B60N 2/4495 297/423.1 |
| 9,221,370 | B2 * | 12/2015 | Ketels | B60N 3/06 |
| 9,744,894 | B2 * | 8/2017 | Carlioz | B60N 3/063 |
| 2005/0012377 | A1 * | 1/2005 | Ito | B60N 2/0232 297/423.26 |
| 2008/0265648 | A1 * | 10/2008 | Clough | B60N 3/063 297/423.26 |
| 2009/0177128 | A1 * | 7/2009 | Fukuyama | A61H 7/001 601/98 |
| 2009/0322139 | A1 * | 12/2009 | Clough | B60N 3/063 297/423.15 |
| 2010/0102612 | A1 * | 4/2010 | Walters | A47C 7/506 297/354.1 |
| 2014/0021765 | A1 * | 1/2014 | Suzuki | B60N 3/063 297/423.19 |
| 2014/0084659 | A1 * | 3/2014 | Archambault | B60N 3/063 297/423.19 |
| 2015/0021969 | A1 * | 1/2015 | Yin | B64D 11/0643 297/423.26 |
| 2015/0175227 | A1 * | 6/2015 | Chang | B60N 2/16 180/22 |
| 2016/0001786 | A1 * | 1/2016 | DiFiore | B60N 2/50 297/217.1 |

FOREIGN PATENT DOCUMENTS

| | | |
|---|---|---|
| KR | 10-2011-0009794 A | 1/2011 |
| KR | 10-2011-0009797 A | 1/2011 |

* cited by examiner

[FIG.4]
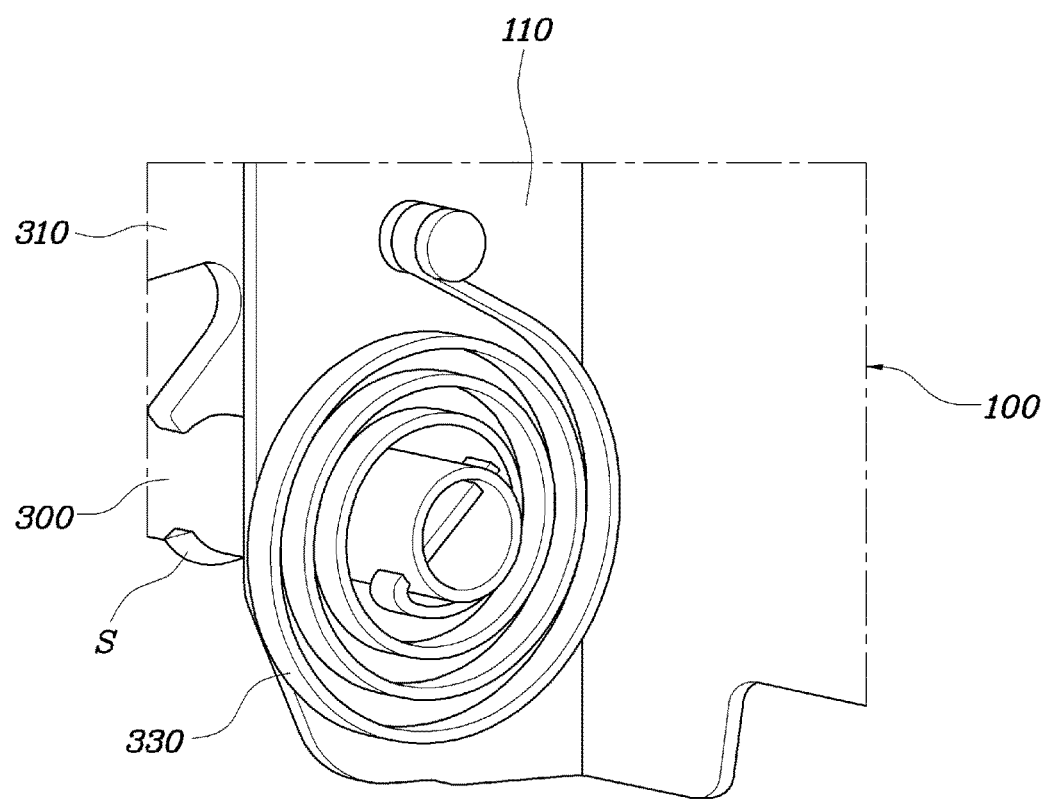

FOOTREST APPARATUS

CROSS-REFERENCE TO RELATED APPLICATIONS

This application is a nationalization of International Application No. PCT/KR2015/007104, filed on Jul. 9, 2015, which claims priority to and the benefit of Korean Patent Application No. 10-2014-0094562, filed on Jul. 25, 2014, the entirety of each of which are hereby incorporated by reference.

FIELD

The present disclosure relates to a footrest and, more particularly to an automotive footrest that is coupled to the back of a front seat to improve convenience of a passenger in a rear seat in a vehicle.

BACKGROUND

The statements in this section merely provide background information related to the present disclosure and may not constitute prior art.

In general, when moving by a transport such as a vehicle or an airplane, users feels tired because they usually spend a lot of time in seats. As can be seen from an economy class syndrome that causes death due to pulmonary embolism such as difficult breathing or cardiopulmonary arrest by formation of blood clots in veins and clogging of the pulmonary arteries during a long airplane flight, in narrow seats, long-time seating in a seat with knees folded is closely related to not only fatigue of a body, but the life of passengers.

In particular, the existing footrests are complicated in structure and heavy, so that costs are increased. Further, when a footrest is operated by a motor, a motor generating large power is required because the footrest is heavy, as well as noise of the motor and its costs are increased.

The description provided above as a related art of the present disclosure is just for helping understanding the background of the present disclosure and should not be construed as being included in the related art known by those skilled in the art.

SUMMARY

The present disclosure provides a footrest that has a simple structure and light weight, and can be sufficiently operated even by a motor having small power, whereby it can remove noise and reduce costs.

A footrest in one form of the present disclosure may include: a bracket that has a plurality of wings and is coupled to a back of a seat, the plurality of wings spaced apart at a predetermined distance from each other and configured to extend rearward; an actuating unit configured to rotate a rotary shaft hingedly coupled to the plurality of wings; and a panel that is coupled to the rotary shaft and is configured to be folded or unfolded toward or away from a seatback when the rotary shaft is rotated.

The footrest of the present disclosure may further include rotary arms having one end fixed to the rotary shaft and the other end fixed to the panel, the rotary arms configured to connect the rotary shaft to the panel.

An end of the rotary arms may be firmly inserted into the front surface of the rotary shaft. In one form, the end of the rotary arms may rigidly mounted on the front surface of the rotary shaft and a part of the end may extend rearward to surround the rotary shaft.

The panel may be formed separately from the rotary arms and fitted on the rotary arms.

An elastic member having one end coupled to at least one wing of the plurality of wings and the other end coupled to the rotary shaft. In particular, the elastic member is configured to apply elasticity to the rotary shaft when the rotary shaft is rotated for folding or unfolding of the panel.

A driving gear may be formed on a driving shaft of the actuating unit and is configured to mesh with a rotary gear formed on the rotary shaft at a position corresponding to the driving gear, so when the actuating unit is operated, the driving gear and the rotary gear are rotated together.

The panel may further include an upper panel and a lower panel that cover the panel at upper and lower portions.

According to the footrest having the structure described above, it is possible to implement a simple structure in which the rotary arms are coupled to the rotary shaft and the panel is fitted on the rotary arms, so it is possible to reduce the weight and manufacturing cost of a vehicle. In particular, since the elastic member is coupled to the rotary shaft, a motor having small power relative to the related art, so it is possible to increase operation efficiency of a motor, reduce weight and costs, and remove operational noise.

Further, since the panel is fitted on the rotary arms, it is possible to increase efficiency in the process of work. Furthermore, since the rotary shaft is rotated using the gears of the actuating unit and the rotary shaft, more accurate and precise control is possible and strength of the footrest is ensured, so operation efficiency can be improved as compared with the related art.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 4 is a view showing in detail an elastic member shown in FIG. 1.

The drawings described herein are for illustration purposes only and are not intended to limit the scope of the present disclosure in any way.

DETAILED DESCRIPTION

A footrest in one form of the present disclosure is described hereafter with reference to the accompanying drawings.

Although a footrest in one form of the present disclosure is coupled to a front seat for the passenger in a rear seat in a vehicle, the footrest can be freely applied to transports with series of seats. It is possible to appropriately adjust the angle of the footrest in accordance with the shapes or preferences of users by sequentially folding or unfolding to satisfy the preferences of the users by operating a specific switch (not shown). Further, it is also possible to provide convenience and comfort for a passenger in a rear seat by automatically adjusting the angle of the footrest through a controller (not shown) using a sensor (not shown), which senses the reclining angle of a front seat, on the basis of values stored in the controller through an IMS (Integrated Memory System).

Figure 1:
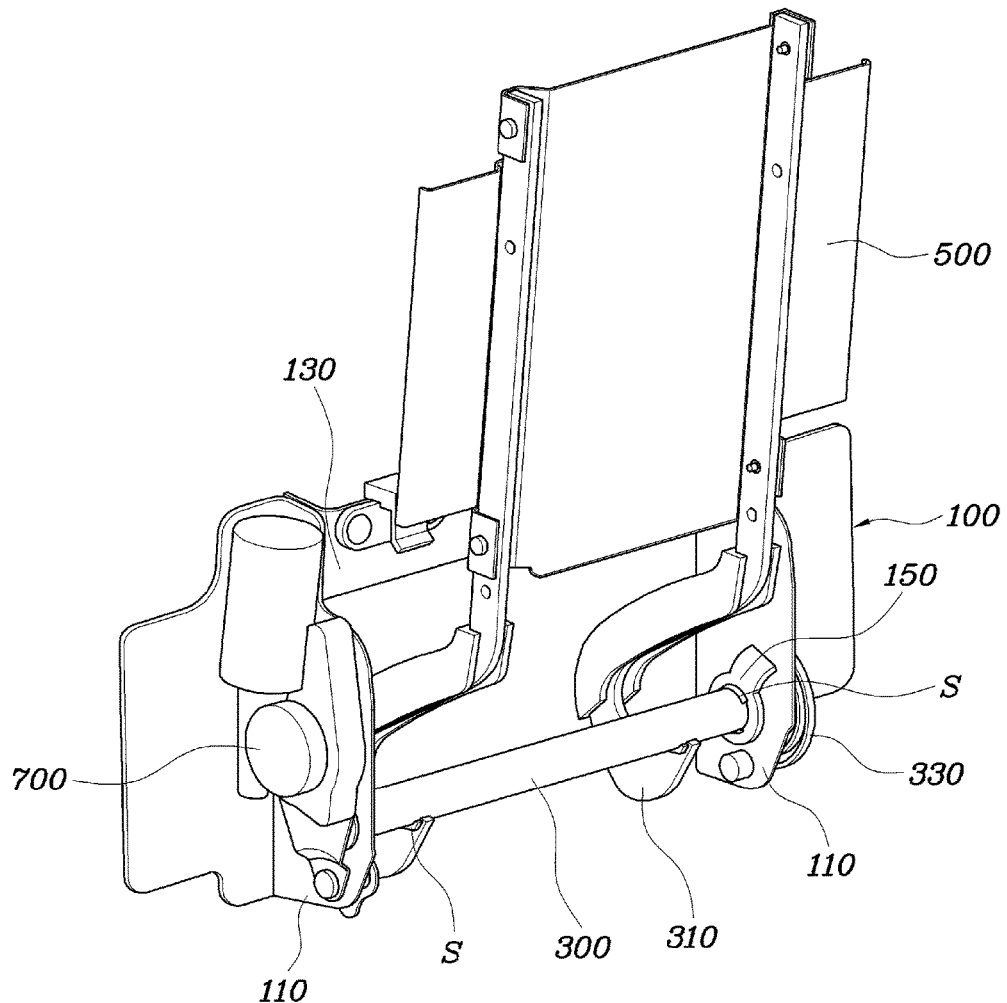
FIG. 1 is a view showing a footrest in one form of the present disclosure.
Figure 2:
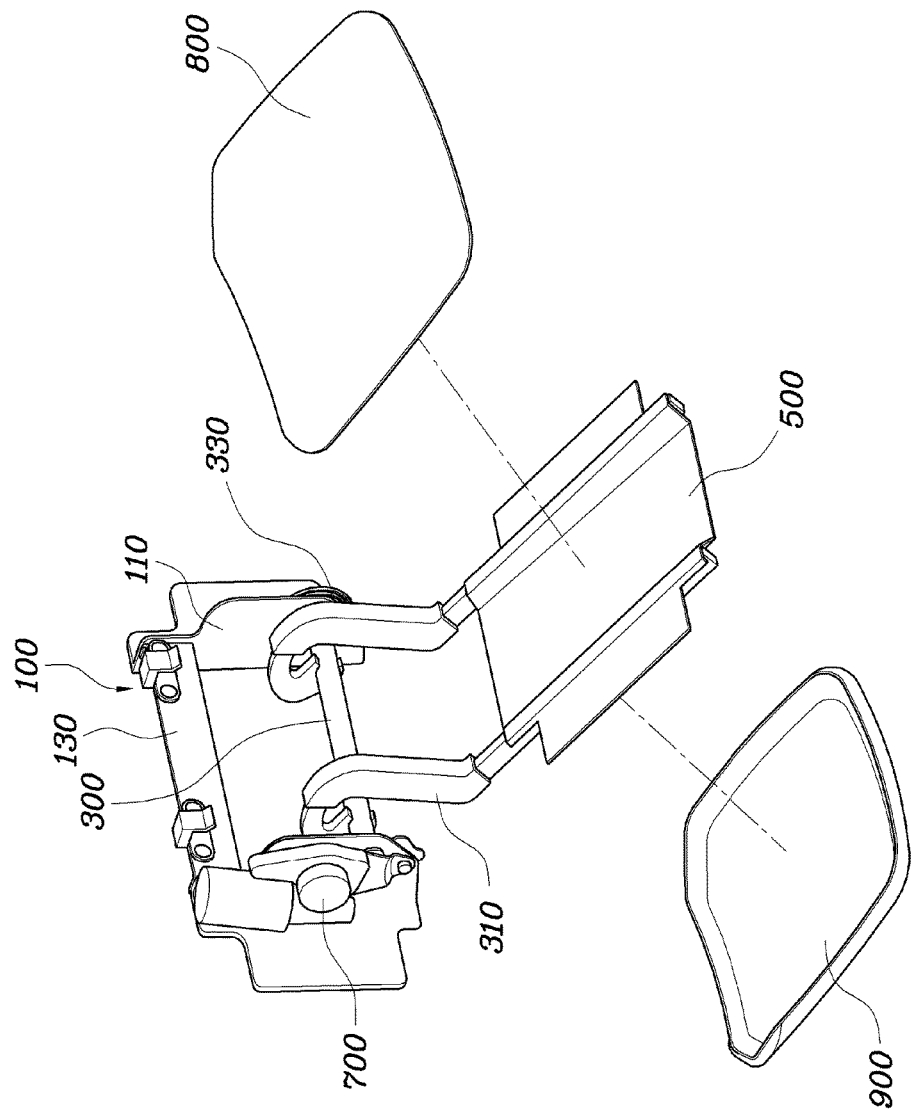
FIG. 2 is a view when the footrest shown in FIG. 1 is unfolded.
Figure 3:
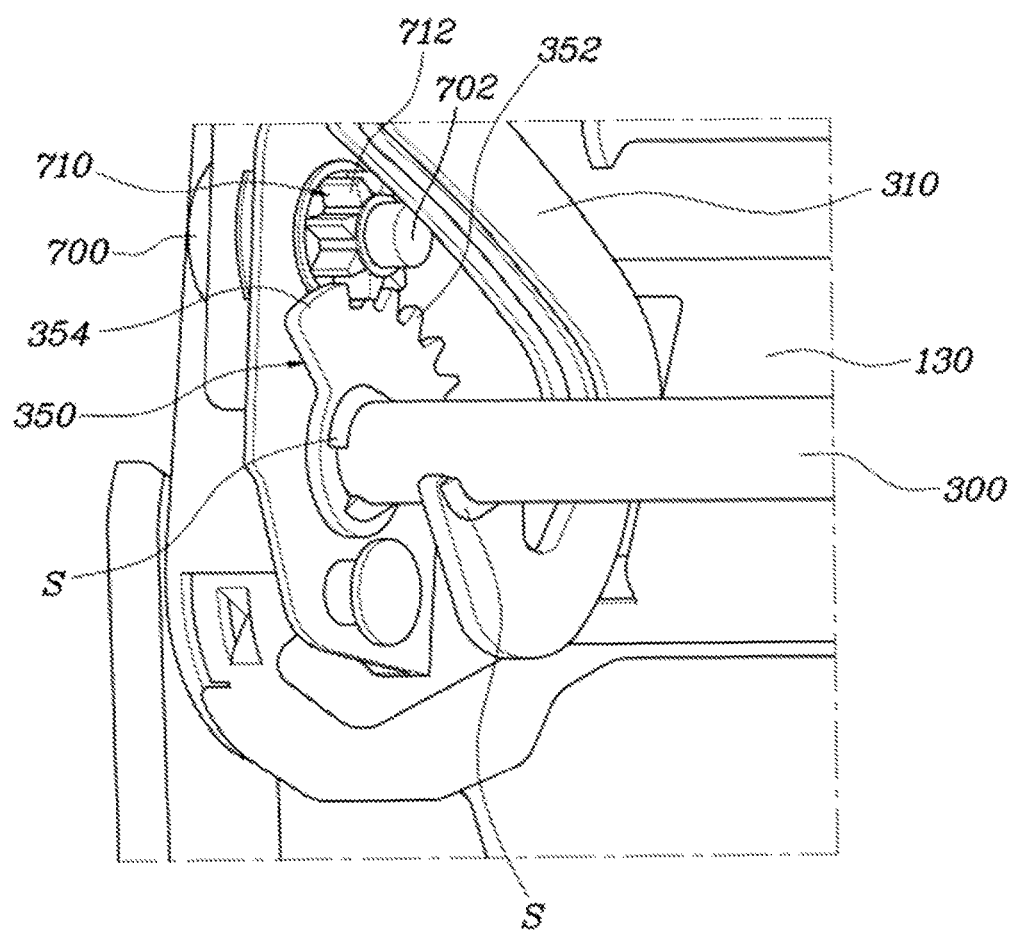
FIG. 3 is a view showing in detail an actuating unit shown in FIG. 1.

FIG. 1 is a view showing a footrest in one form of the present disclosure, and FIG. 2 is a view when the footrest shown in FIG. 1 is unfolded. Further, FIG. 3 is a view showing in detail an actuating unit 700 shown in FIG. 1 and FIG. 4 is a view showing in detail an elastic member 330 shown in FIG. 1.

In one form, a footrest includes: a bracket 100 that has a plurality of wings 110 spaced apart at a predetermined distance from each other and extending rearward, and is coupled to the back of a seat; a rotary shaft 300 that is disposed between the wings 110 of the bracket 100 and is hinged to the wings 110 to rotate when the actuating unit 700 is operated; and a panel 500 that is coupled to the rotary shaft 300 and is folded or unfolded toward or away from a seatback when the rotary shaft 300 is rotated. Further, rotary arms 310 having one end fixed to the rotary shaft 300 and the other end fixed to the panel 500 may be further provided between the rotary shaft 300 and the panel 500.

The bracket 100 is coupled to the back of a front seat. The bracket is composed of a plurality of frames 130 and the wings 110 extending rearward in a vehicle are formed at both sides of the frame 130. The wings 110 may be formed at a predetermined distance from each other. The rotary shaft 300 is coupled across the wings 110 of the bracket 100. The rotary shaft 300 is coupled to the wings 110.

Describing the coupling relationship between the rotary shaft 300 and the wings 110, ends of the rotary shaft 300 partially passes through the wings 110. An elastic member 330 is coupled to the outer side of one wing 110 of the wings 110 fitted on the rotary shaft 300 and the actuating unit 700 is coupled to the outer side of another wing 110 as illustrated in FIGS. 1-2.

First, a separate rotary member 150 is coupled to the inner side of the one wing 110 at an end of the rotary shaft 300 and fixes the rotary shaft 300. Accordingly, the rotary shaft 300 and the wings 110 are hinged to rotate about the rotary shaft 300, and the rotary member 150 is fitted on the rotary shaft, so when the actuating unit 700 is operated, the rotary shaft 300 is rotated with the rotary member 150.

Further, as shown in FIG. 4, since the elastic member 330 is coupled to the outer side of the wing 110, when the rotary shaft 300 is rotated, the rotary shaft 300 can be more elastically rotated. The elastic member 330 has one end fixed to the wing 110 and the other end fixed to the rotary shaft 300, and the elastic member 330 may be a torsion spring. When the actuating unit 700 is operated and the rotary shaft 300 is rotated to unfold the panel 500, the operation efficiency of the actuating unit 700 can be increased by reducing the initial operation load of the actuating unit 700, so the panel 500 can be more easily unfolded. Further, the other end of the elastic member 330 is coupled to the rotary shaft 300, so the rotary shaft 300 is elastically supported. Accordingly, the gap between the rotary shaft 300 and the wing 110 can be minimized, so it is possible to remove vibration or malfunction due to the gap when folding or unfolding the panel 500.

Second, as in FIG. 3, the actuating unit 700 is coupled to the outer side of the wing 110 at the other end of the rotary shaft 300. A driving gear 710 is formed on a driving shaft 702 of the actuating unit 700 which passes through the wing 110, and the driving gear 710 has teeth 712 protruding outward and is coupled to the inner side of the wing 110. A rotary gear 350 having teeth 352 protruding on the outer side and fitted through the rotary shaft 300 is coupled to the inner side of the wing 110, so when the actuating unit 700 is operated, the driving gear 710 and the rotary gear 350 are rotated in mesh with each other, and accordingly, the rotary shaft 300 is rotated. The rotary gear 350 also functions as the rotary member 150.

As described above, as the driving gear 710 and the rotary gear 350 are rotated in mesh with each other, the footrest can be precisely controlled step by step, so it is possible to easily and accurately adjust and control the angle. The rotary gear 350 of the rotary shaft 300 has teeth 352 protruding outward along a circumference of the rotary shaft 300 and is fitted through the rotary shaft 300 in the drawings, but the detailed shape and position of the teeth may be freely changed in accordance with the design or environment. One of skill in the art will appreciated that as shown in FIG. 2, stoppers 354 are formed on both ends of the rotary gear 350 along the circumferential direction of the rotary gear 350, and the stoppers each have an extended gap formed between an outer most tooth of the rotary gear 350 and the stopper 354. The extended gap is larger than a predetermined gap formed between the plurality of teeth 352 of the rotary gear 350, so that when the actuating part 700 is operated, the driving gear 710 and the rotary gear 350 are rotated together with the rotary shaft 300, and rotation of the rotary shaft 300 is restricted when any of the teeth 712 of the driving gear 710 is placed on any of the stoppers 354 of the rotary gear 350. Further, a gear cover (not shown) may be coupled between the gears 710 and 350 and the rotary arms 310 to prevent interference with other components and accumulation of foreign substances, but the gear cover is not shown in FIG. 3 to show more clearly the gears 710 and 350.

The panel 500 that is folded or unfolded toward or away from a seatback when being rotated by the actuating unit 700 is coupled to the rotary shaft 300. The panel 500 has the shape of a plate and may have bar-shaped supports, which are coupled to the rotary arms 310, at the lower portion. Further, an upper pad 800 and a lower pad 900 may be coupled to the upper and lower portions of the panel 500 to cover the panel 500 in order to provide convenience and comfort for a passenger.

Further, the rotary arms 310 having one end fixed to the rotary shaft 300 and the other end fixed to the panel 500 may be disposed between the rotary shaft 300 and the panel 500. The rotary arm 310 is coupled to the rotary shaft 300 for example by welding, so it is rigidly fixed to the rotary shaft 300. In particular, the rotary arms 310 are inserted into the front of the rotary shaft 300 and extend rearward to surround the rotary shaft 300 in an arc shape. The rotary arms 310 may have particularly the shape of a hook. Further, the panel 500 is formed separately from the rotary arms 310 and then fitted on the rotary arm 310, whereby it is possible to allow for easy work, reduce the process of work, and increase the efficiency of work.

Further, seals S or bearings may be disposed between the rotary shaft 300 and the rotary arms 310, between the rotary shaft 300 and the rotary gear 350, and between the rotary shaft 300 and the rotary member 150 to allow smooth operation of components and prevent fiction or noise of the components when the rotary shaft 300 is rotated.

Therefore, according to the footrest, it is possible to implement a simple structure in which the rotary arms 310 are coupled to the rotary shaft 300 and the panel 500 is fitted on the rotary arms, so it is possible to reduce the weight and manufacturing cost of a vehicle. In particular, since the elastic member 330 is coupled to the rotary shaft, a motor having small power relative to the related art may be used, so that it is possible to increase operation efficiency of a motor, reduce weight and costs, and remove operational noise. Further, since the panel 500 is fitted on the rotary arms 310, it is possible to increase efficiency in the process of work. Furthermore, since the rotary shaft 300 is rotated using the gears of the actuating unit 700 and the rotary shaft, 300 more accurate and precise control is possible and strength of the footrest is provided, so that operation efficiency can be improved as compared with the related art.

Although the present disclosure was described with reference to specific forms shown in the drawings, it is apparent to those skilled in the art that the present disclosure may be changed and modified in various ways without departing from the scope of the present disclosure.

The invention claimed is:

1. A footrest comprising:
   a bracket that has a plurality of wings and that is coupled to a back of a seat, the plurality of wings spaced apart at a predetermined distance from each other and configured to extend;
   an actuating part configured to rotate a rotary shaft hingedly coupled to the plurality of wings; and
   a panel coupled to the rotary shaft and configured to be folded or unfolded toward or away from a seatback when the rotary shaft is rotated,
   wherein a driving gear defines a plurality of teeth and is formed on a driving shaft of the actuating part,
   wherein a rotary gear defines a plurality of teeth and is formed on the rotary shaft in a circumferential direction of the rotary shaft, where the plurality of teeth of the rotary gear is configured to mesh with the plurality of teeth of the driving gear,
   wherein stoppers having an extended gap are formed on both ends of the rotary gear, where the extended gap is formed between an outer most tooth of the plurality of teeth of the rotary gear and one of the stoppers, and
   wherein the extended gap is larger than a predetermined gap formed between adjacent teeth of the plurality of teeth of the rotary gear, so that when the actuating part is operated, the driving gear and the rotary gear are rotated together with the rotary shaft, and rotation of the rotary shaft is restricted when any of the teeth of the plurality of teeth of the driving gear is placed on any of the stoppers of the rotary gear.

2. The footrest of claim 1, further comprising rotary arms having a first end fixed to the rotary shaft and a second end fixed to the panel, respectively, where the rotary arms are configured to connect the rotary shaft to the panel.

3. The footrest of claim 2, wherein the first ends of the rotary arms are firmly inserted into a front surface of the rotary shaft, respectively.

4. The footrest of claim 2, wherein the panel is formed separately from the rotary arms and fitted on the rotary arms.

5. The footrest of claim 2, wherein the first ends of the rotary arms are rigidly mounted on a front surface of the rotary shaft, respectively, and parts of the second ends of the rotary arms are configured to extend rearward and surround the rotary shaft, respectively.

6. The footrest of claim 1, further comprising a coil spring having one end coupled to at least one wing of the plurality of wings and another end coupled to the rotary shaft, wherein the coil spring is configured to apply elasticity to the rotary shaft when the rotary shaft is rotated for folding or unfolding of the panel.

7. The footrest of claim 1, wherein the panel further comprises an upper panel and a lower panel configured to cover the panel at upper and lower portions, respectively.

* * * * *